June 27, 1967  S. I. SLATER  3,328,676

CONTINUOUSLY VARIABLE DIMMER SWITCH

Original Filed Jan. 18, 1960

INVENTOR.
SAUL I. SLATER

BY Darby & Darby

ATTORNEY

United States Patent Office 3,328,676
Patented June 27, 1967

3,328,676
CONTINUOUSLY VARIABLE DIMMER SWITCH
Saul I. Slater, Glen Cove, N.Y., assignor to Slater Electric, Inc., Glen Cove, N.Y., a corporation of New York
Application Jan. 4, 1963, Ser. No. 250,458, which is a division of application Ser. No. 3,144, Jan. 18, 1960. Divided and this application July 1, 1966, Ser. No. 562,259
10 Claims. (Cl. 323—22)

ABSTRACT OF THE DISCLOSURE

This disclosure relates to power control and switch devices in which a semi-conductor control element provides substantially continuous control of power to a load over a substantial range of power values and in which the control for the semi-conductor element is coupled to a sliding switch providing a physical interruption in the electrical circuit at the "off" position and preferably a direct electrical connection in a full "on" position.

---

This is a division of U.S. patent application No. 250,458 filed Jan. 4, 1963, which, in turn, is a division of application No. 3,144 filed Jan. 18, 1960 and now abandoned.

The device of the present invention may typically be applied to the dimming of lights. It will be understood, however, that the usefulness of the invention is not limited to such applications but that it also may be utilized to control certain other types of devices, for example, certain types of motors, heaters, or the like.

Various types of devices have previously been utilized for the dimming of lights both in commercial and residential applications. Frequently, transformers or auto-transformers are utilized for this purpose. Although such previous devices have performed the desired function adequately, they suffer from the disadvantage that they are large and bulky and hence normally require an oversize junction box for installation and special installation methods. Furthermore, transformers of sufficient capacity are quite expensive as compared with a simple two position switch so that the use of dimmer switches has not become wide-spread. Devices such as rheostats are usually impractical due to the large amount of power which they wastefully dissipate.

The present invention provides a dimmer switch which is continuously variable over a substantial range of power values but which is simple and relatively inexpensive compared with previously known devices, and which is formed of a relatively small number of components of moderate size so that the unit can be readily installed in a standard outlet box as a direct replacement for the usual two position switch.

In addition to the above features and advantages it is an object of the invention to provide a simple continuously variable light-dimming circuit comprising a silicon controlled rectifier or equivalent device.

It is a further object of the invention to provide a simple and inexpensive continuously variable dimmer switch circuit wherein the relative proportion of an alternating current cycle which is passed by the circuit is controllable over a substantial range.

It is a still further object of the present invention to provide a circuit of the foregoing type which is in all cases directly substitutable in a circuit which previously employed the customary single pole-single throw switch; that is, the circuit, according to the present invention, may be inserted where access is available to only one of the two lines leading to an electrical device to be controlled by the dimmer switch.

Other objects and advantages will be apparent from a consideration of the following description in conjunction with the appended drawings in which.

Figure 1:
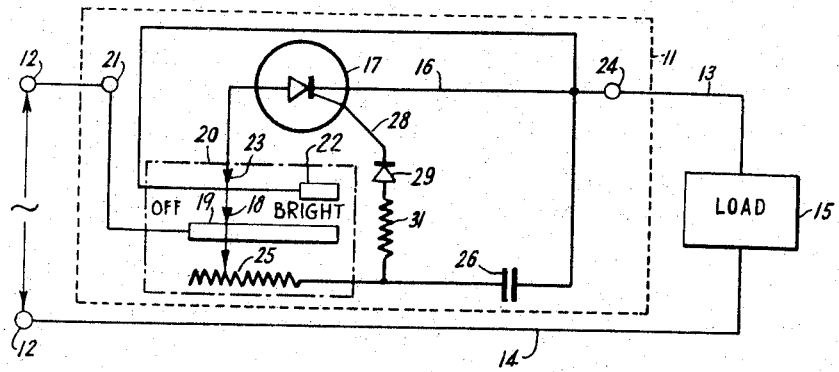
FIGURE 1 is a schematic circuit diagram of a continuously variable dimmer switch circuit according to the present invention.

Referring to FIGURE 1, two terminals 12 of a conventional alternating current household power supply are shown. The voltage of such a power supply is customarily approximately 115 volts and the frequency usually 60 cycles per second in the United States. Although the invention is not limited to such standards the particular embodiment shown is designed for such standards. Adaptation of the circuit to other standards could, of course, be made by those of ordinary skill in the art.

One terminal of the alternating current power supply is connected directly to a load 15 by means of conductive lead 14. In conformance with standard practice this terminal 12 of the power supply will be the "ground" terminal.

The load 15 will typically be an incandescent lamp; however, other loads may be utilized in connection with the switch of the present invention, for example, heaters, universal motors, and certain other devices. Certain types of devices cannot be utilized as a load in a circuit incorporating the switch according to the present invention due to the fact that the switch introduces a direct current component into the circuit. Thus, devices strictly for alternating current use may not be usable with switches according to the present invention and in some cases may be damaged by such use.

Load 15 is connected to the power supply second terminal 12 through lead 13 and continuously variable dimmer switch 11. It will be noted that the switch 11 has only two terminals, 21 and 24, required to be connected into the electrical circuit, and that it is necessary to connect the switch 11 into only one side of the electrical power line so that the usual single pole-single throw switch may be directly replaced by the dimmer switch of the present invention. This is in contrast to dimmer arrangements utilizing variable transformers or auto-transformers or other which require that the dimmer switch be connected into both sides of the power line.

In the circuit of the switch 11, lead 16 connects terminal 24 to the cathode of a silicon-controlled rectifier 17. The operation of the silicon-controlled rectifier 17 will be explained in more detail, but for the moment it will suffice to say that it operates in a fashion generally similar to that of a grid-controlled thyratron tube.

The anode of the silicon-controlled rectifier 17 is connected through switch 20 to the line terminal 21. Line terminal 21 is connected to a terminal 12 of the household power supply.

The switch 20 is a combined switch and variable resistor including a sliding contact 18 and a contact strip 19. The contact 18 is slidable along the length of contact strip 19 and for a short distance to the left of contact strip 19 where the legend "off" appears. Thus, when the sliding contact 18 is moved to the extreme left in FIGURE 1, all electrical connections to terminal 21 of dimmer switch 11 are broken thus interrupting the electrical circuit of the load 15.

When the sliding contact 18 is moved to the extreme right in FIGURE 1, where the legend "Bright" appears, the sliding contact 23 which moves with the sliding contact 18 comes in contact with a contact strip 22 thereby completing an electrical connection from terminal 21 of dimmer switch 11 through contact strip 19, sliding contact 18, sliding contact 23, and contact strip 22 to terminal 24 of dimmer switch 11, thereby completing the electrical circuit to the load 15 in a manner which does not diminish the power supplied to the load 15, that is, does not provide dimming. From the foregoing explanation it will be seen that the switch 20 provides a full "on" and a full "off" condition for power supplied to the load 15 independent of any operation of the silicon controlled rectifier 17.

A resistance winding 25 is provided in the combination variable resistor and switch 20 with a sliding contact which effectively is connected to terminal 21 of dimmer switch 11 for all positions except the "off" position of switch 20. The variable resistor 25 is connected through a capacitor 26 to terminal 24 of dimmer switch 11.

The variable resistor 25 and the capacitor 26 comprise a variable phase shift circuit in which the voltage appearing at the junction of capacitor 26 and variable resistor 25 is of variable phase with respect to the voltage appearing at terminal 21 of dimmer switch 11. Thus, when the variable resistor 25 is completely shorted so that it has effectively no resistance, the phase of the voltage with respect to terminal 24 as measured at the junction of capacitor 26 and resistor 25 will be the same as that measured at terminal 21. However, the phase of the voltage with respect to terminal 24 measured at this junction for other conditions of the variable resistor 25 will lag the phase of the voltage appearing at terminal 21 by an amount generally proportional to the amount of resistance provided by resistor 25.

The junction between capacitor 26 and resistor 25 is connected through a limiting resistor 31 and a diode 29 to the gate lead 28 of silicon controlled rectifier 17. By way of example the values of the circuit parameters in FIGURE 1 may be as follows:

Maximum resistance of resistor 25, 5,000 ohms; resistance of resistor 31, 7,500 ohms; capacitance of capacitor 26, .5 microfarad; type No. of rectifier 17, C36B (General Electric Co.). No particular high performance requirements need be met by diode 29 and it may be selected from many available types, primarily on the basis of economy.

The operation of silicon controlled rectifiers is well known in the electrical art, but for convenience a simple explanation of their general characteristics will be presented to aid in the explanation of the operation of the circuit of FIGURE 1.

Figure 4:
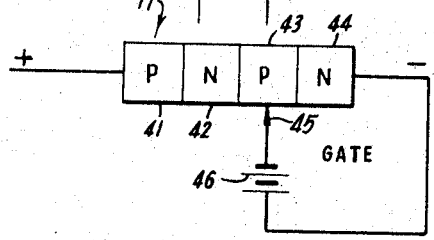
FIGURE 4 is a schematic diagram of a silicon controlled rectifier and associated gating circuit presented to aid in the explanation of the operation of the invention.

Referring to FIGURE 4, it will be seen that a silicon controlled rectifier 17 is a PNPN semi-conductor device comprising a P layer 41, and N layer 42, a P layer 43 and an N layer 44. The P layer 41 serves as the anode of the device and the N layer 44 serves as the cathode. A gate terminal 45 is provided at the P layer 43.

A silicon controlled rectifier has a reverse current blocking characteristic generally similar to that of silicon rectifiers or other types of rectifiers. The forward current in the silicon controlled rectifier is controlled by the gating signal, that is, a gating signal is required to allow conduction in the forward direction; once started, forward conduction will continue even after removal of the gate signal. Although it is in some respects similar to a grid-controlled thyratron the gate signal of the silicon-controlled rectifier is essentially a current signal rather than a voltage signal. This consideration is of importance to the circuit designer.

In FIGURE 4 the silicon controlled rectifier 17 is shown in the conducting condition due to the gate current signal supplied at gate terminal 45 by the biasing battery 46 which provides a positive voltage at 45 with respect to the silicon controlled rectifier cathode 44. It should be noted that it may be possible in some cases to derive a positive voltage to produce the desired gate current from the anode terminal of the silicon controlled rectifier.

Having explained the operation of the silicon controlled rectifier 17 by reference to FIGURE 4, a more detailed explanation of the circuit of FIGURE 1 will now be presented. When the sliding contacts 23 and 18 are moved to the extreme right in FIGURE 1, full power is supplied to the load 15 through the circuit including terminal 21, contact strip 19, sliding contact 18, sliding contact 23, contact strip 22 and terminal 24. When the sliding contacts 18 and 23 are to the extreme left or "Off" position in FIGURE 1 (out of contact with strips 19 and 22) there is no complete circuit through the load 15 and no power is supplied thereto.

When sliding contact 18 is moved just off the "Bright" position the slider of variable resistance 25 is positioned so that little or no resistance from the variable resistance 25 is in the circuit. Accordingly at the beginning of the half cycle of alternating current when the voltage applied to terminal 21 begins to go positive, a positive voltage in phase with the rectifier anode-cathode voltage is applied from terminal 21 to the gate lead 28 of the silicon controlled rectifier 17 causing a gating current to flow through the silicon controlled rectifier 17 turning it on and allowing current to flow therethrough. As previously explained, once the current flow is started through the silicon controlled rectifier 17, it will continue for the duration of the positive half cycle. As a result, approximately one-half of the A.C. cycle is supplied to the load.

The resistor 31 and diode 29 assure that the gate current to the silicon controlled rectifier 17 flows only in the proper direction and is not of excessive magnitude.

Consider now the situation where the sliding contact of variable resistor 25 is moved to the left in FIGURE 1 just short of the "off" position. For convenience let us assume that the effective resistance of variable resistor 25 in ohms is then equal to the capacitive reactance of the capacitor 26 in ohms. The current through the resistance-capacitance branch of the circuit then, neglecting any current flowing through the rectifier 17, will lead the applied voltage by 45°. The voltage across resistor 25 will thus lead the total applied voltage by 45° while the voltage across capacitor 26, lagging the resistor voltage by 90°, will lag the total applied voltage by 45°. Thus it will be seen that the voltage inducing the gate current for the rectifier 17 will be a positive voltage lagging the anode-cathode voltage by 45°. Accordingly the positive gate current necessary to fire the rectifier 17 will not be available until some time after ⅛ of one cycle following the beginning of the positive half cycle. For positions of the sliding contact of resistor 25 between its two extreme positions, the phase shift of the gate signal applied to rectifier 17 will vary between approximately zero degrees and something more than 45° at maximum. Thus, the dimmer switch 21 provides at the extreme left a full "off" position; this is followed by a very dim position wherein substantially less than half power is provided to the load. The power provided is then variable through a substantial range until full half power is supplied to the load; following this there is at the extreme right a position at which full power is supplied to the load.

While silicon controlled rectifiers are particularly well adapted for use in the present invention, other control elements could be utilized to perform an equivalent function in electrical circuits according to the present invention.

While continuous variability is not provided throughout the range from off to full power, in the circuit of FIGURE 1, the continuously variable range is particularly effective as a practical matter, especially when the switch is used in conjunction with incandescent lamps. At low powers incandescent lamps have a marked drop in efficiency for the production of visible light. Due to this fact the variable dimmer according to the present invention readily allows the dimming of an incandescent lamp until its visible light output is 5% or less of its maximum value. It will be appreciated that further dimming would be of relatively little value in the usual household or similar application.

The phase shift network comprising resistor 25 and capacitor 26 in FIGURE 1 is a simple means of providing a suitable delay for the gating signal to the silicon controlled rectifier 17. It is obvious that any other phase shift or time delay means suitable for providing the desired controllable delay on each cycle of alternating current could be substituted in the circuit. By use of other delay or phase shift means, such as a relaxation oscillator or saw-tooth generator type circuit, the range of time delay and hence the range of power variation subject to continuous control could be increased to a range of approximately 50% of full power if desired.

Furthermore by the addition of an oppositely polarized diode in parallel with silicon controlled rectifier 17 and appropriate switching, the range of power from 50% to 100% could also be provided with substantially continuous control.

Alternatively two dimmer switch circuits 11 or their equivalent could be arranged in parallel but with opposite polarity to give continuous power control above 50% of full power. If the controls of these two circuits were ganged together, the average current through the load would be zero, that is no substantial D.C. component would exist, and certain devices which might be damaged by direct current components of the circuit of FIGURE 1 could be operated with the double dimmer circuit arrangement without any difficulty.

The circuit of FIGURE 1 has the advantage of being compact and simple so that it is readily incorporated in a switch enclosure of conventional size which can be placed in the usual single outlet box.

Figure 2:
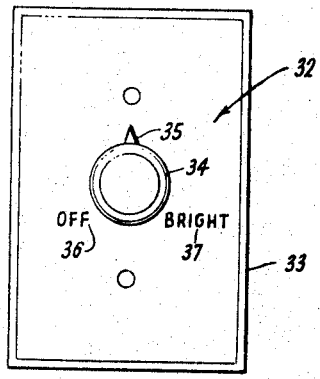
FIGURE 2 is a front elevational view of a switch-plate and housing for a dimmer switch according to the present invention.
Figure 3:
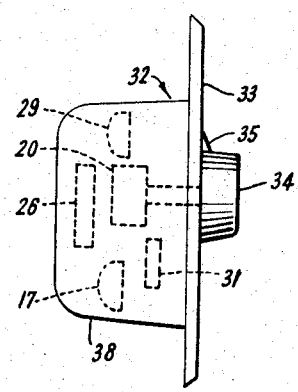
FIGURE 3 is a side elevational view of the device of FIGURE 2.

The complete switch enclosure may take the form shown in FIGURES 2 and 3. The dimmer switch enclosure 32 is provided with a conventional switch plate 33 having mounted centrally thereon a control knob 34 having a pointer 35 and legends 36 and 37 indicating the full "Off" position and the "Bright" position respectively. A housing 38 may be attached in any suitable fashion to the switch-plate 33. These two elements may be installed as a single unit or alternatively the housing 38 may be adapted to be installed in the outlet box first and the switch-plate 33 and knob 34 added after installation of the housing 38.

In any case it will be seen that circuit components of usual sizes readily available may be arranged in the housing 38. FIGURE 3 shows illustratively an arrangement of diode 29, silicon controlled rectifier 17, capacitor 26 and resistor 31 together with combined switch and variable resistor unit 20 (in dotted lines).

In FIGURE 1 the combined switch and variable resistor unit 20 is shown schematically in flat form, but it will be appreciated that it may be preferred that it be made in cylindrical form with a rotatable knob for adjustment thereof, as shown in FIGURE 3. In fact, the switching arrangement shown may in some cases be eliminated or may be replaced by any other suitable switching arrangement for the particular application at hand.

From the foregoing explanation it will be appreciated that a continuously variable dimmer switch is provided by the present invention which is remarkably simple, compact and inexpensive and may readily be substituted in situations where a conventional snap-type single-pole single throw switch would heretofore have been used.

In addition to the variations of the invention which have been suggested, numerous other variations and modifications will be apparent to those of ordinary skill in the art. It is therefore desired that the scope of the invention not be limited to the particular embodiment and variations suggested but that it be limited solely by the appended claims.

What is claimed is:

1. A power control and switch device providing substantially continuous control of power supplied to a load over a substantial range of power values, comprising two terminals for connecting said device in at least one of two sides of a power line supplying current to the load, at least one control element having two power circuit connections and a gating circuit connection, switch means connecting said control element between said terminals to cause said control element to be connected by means of its power circuit connections so as to provide a current path between said two terminals, and a variable time delay means energized from said power line for providing a gating signal to the gating circuit connection of said control element said variable time delay means including a variable impedance element, said gating signal being controllable by said variable impedance to initiate conduction by said control element at instants of time bearing a controllable relation with respect to the beginning of alternating current cycles of power available at said two terminals, whereby a portion of each alternating current cycle, which portion is continuously controllable in duration over a predetermined range, may be supplied to said load, said switch means comprising a first contact and a second contact slidable with respect thereto, said second contact being in electrical contact with said first contact through part of its range of movement and out of electrical contact therewith at at least one point in said range, means for causing variation of said impedance with relative movement of said contacts over at least a portion of the range of movement thereof, and a further contact means electrically connected to one of said terminals and responsive to the position to said second contact for directly electrically connecting said two terminals through said further contact, said control element being electrically connected between said two terminals only when said first and second contacts are in electrical contact.

2. Apparatus as claimed in claim 1, wherein said variable impedance element is a variable resistor having a minimum resistance value when said further contact is operative to provide a direct connection between said terminals.

3. A power control and switch device providing substantially continuous control of power supplied to a load over a substantial range of power values, comprising two terminals for connecting said device in at least one of two sides of a power line supplying current to the load, at least one control element having two power circuit connections and a gating circuit connection, switch means connecting said control element between said terminals to cause said control element to be connected by means of its power circuit connections so as to provide a current path between said two terminals, and a variable time delay means energized from said power line for providing a gating signal to the gating circuit connection of said control element said variable time delay means including a variable impedance element, said gating signal being controllable by said variable impedance to initiate conduction by said control element at instants of time bearing a controllable relation with respect to the beginning of alternating current cycles of power available at said two terminals, whereby a portion of each alternating current cycle, which portion is continuously controllable in duration over a predetermined range, may be supplied to said load, said switch means comprising a first contact and a second contact slidable with respect thereto, said second contact being in electrical contact with said first contact through part of its range of movement and out of electrical contact therewith at at least one point in said range and means for causing variation of said impedance with relative movement of said contacts over at least a portion of the range of movement thereof, said control element being electrically connected between said two terminals only when said first and second contacts are in electrical contact, and said variable time delay means being energized from said two terminals through said first and second contacts.

4. Apparatus as claimed in claim 3, wherein said variable impedance element is a resistor with a sliding tap and said second contact is slidable and is directly connected to provide sliding motion between said tap and resistor.

5. A power regulating means connectable between an A.C. source and a load for controlling the length of time in one cycle that current flows to the said load; said power regulating means comprising a rectifier, a controllably conductive means and a switching means for connecting said rectifier and said controllably conductive means in a plurality of predetermined circuit relationships; both said rectifier and said controllably conductive means being connected for carrying load current in a first of said predetermined circuit relationships; only said controllably conductive means being connected for carrying load current in a second of said predetermined relationships; said controllably conductive means being characterized in blocking current flow therethrough in a first direction, and controllably passing current in a direction opposite said first direction; said controllably conductive means being continuously controllable throughout substantially all of a half cycle of current flow to permit initiation of current flow at a preselected time within said half cycle; said controllably conductive means comprising a silicon controlled rectifier.

6. A power regulating means connectable between an A.C. source and a load for controlling the length of time in one cycle that current flows between said A.C. source and said load; said power regulating means comprising a rectifier; a controllably conductive means and a switching means electrically connected to said rectifier and said controllably conductive means and operable for connecting said rectifier and said controllably conductive means in a plurality of predetermined circuit relationships with respect to said A.C. source and said load; said controllably conductive means being characterized in blocking current flow therethrough in a first direction and controllably passing current in a direction opposite said first direction; a first of said plurality of predetermined circuit relationships comprising the connection of said controllably conductive means in series with said A.C. source and said load; a second of said plurality of predetermined circuit relationships comprising the parallel connection of said rectifier and said controllably conductive means with respect to one another and in series with said A.C. source and said load; said rectifier conducting load current in the blocking direction of said controllably conductive means in said second of said plurality of predetermined circuit relationships.

7. The device substantially as set forth in claim 6 wherein a third of said plurality of predetermined circuit relationships comprises the direct connection between said A.C. source and said load.

8. The device substantially as set forth in claim 6, wherein said controllably conductive means is continuously controllable through substantially all of a half cycle of current flow to permit initiation of current flow at a predetermined time within said half cycle.

9. The device substantially as set forth in claim 6 wherein said controllably conductive means comprises a 4-layer diode.

10. A light dimmer circuit for controlling the load current applied to a load from a source of A.C. voltage comprising the combination of a controlled rectifier in series with said source and said load, a rectifier, a switching means, and a control means for controlling said controlled rectifier; said switching means having a first switch position and a second switch position; said switching means connecting said rectifier in parallel with said controlled rectifier with the anode of said controlled rectifier connected to the cathode of said rectifier when said switching means is in said first switch position and said controlled rectifier in series with A.C. source and said load whereby load current flows through said rectifier and to said load during one of positive or negative half cycles of the A.C. voltage of A.C. source and through said controlled rectifier during the other of said positive or negative half cycles; said switching means disconnecting said rectifier from said controlled rectifier when said switching means is in its said second switch position.

References Cited
UNITED STATES PATENTS 2,630,555   3/1953   Hursh _____ 318—269

JOHN F. COUCH, *Primary Examiner.*

K. D. MOORE, M. WACHTELL, *Assistant Examiners.*